June 12, 1923.
E. KRUK
SHOCK ABSORBER
Filed Nov. 22, 1921
1,458,302
2 Sheets-Sheet 2
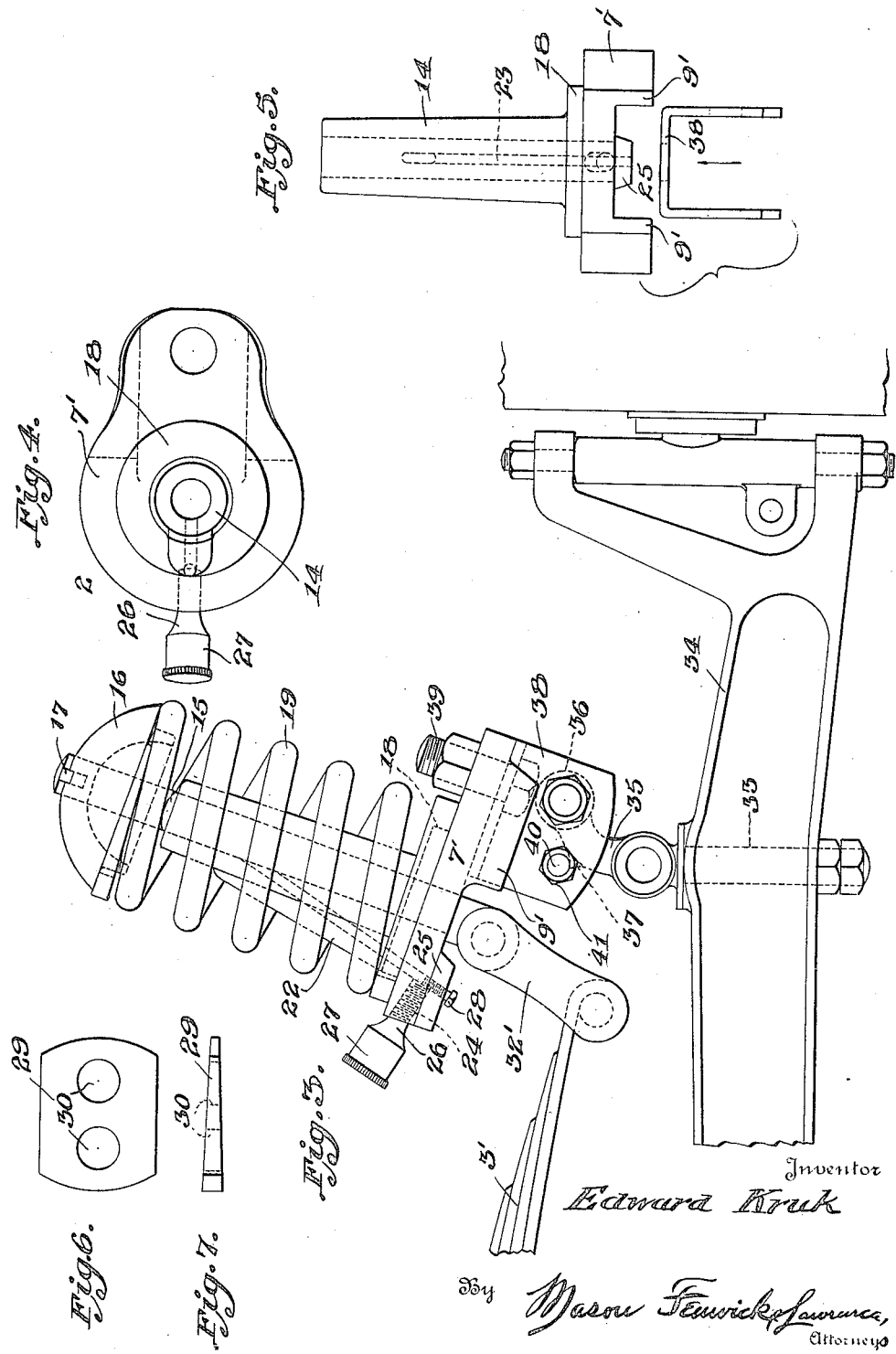
Inventor
Edward Kruk
By Mason Fenwick & Lawrence,
Attorneys Patented June 12, 1923.

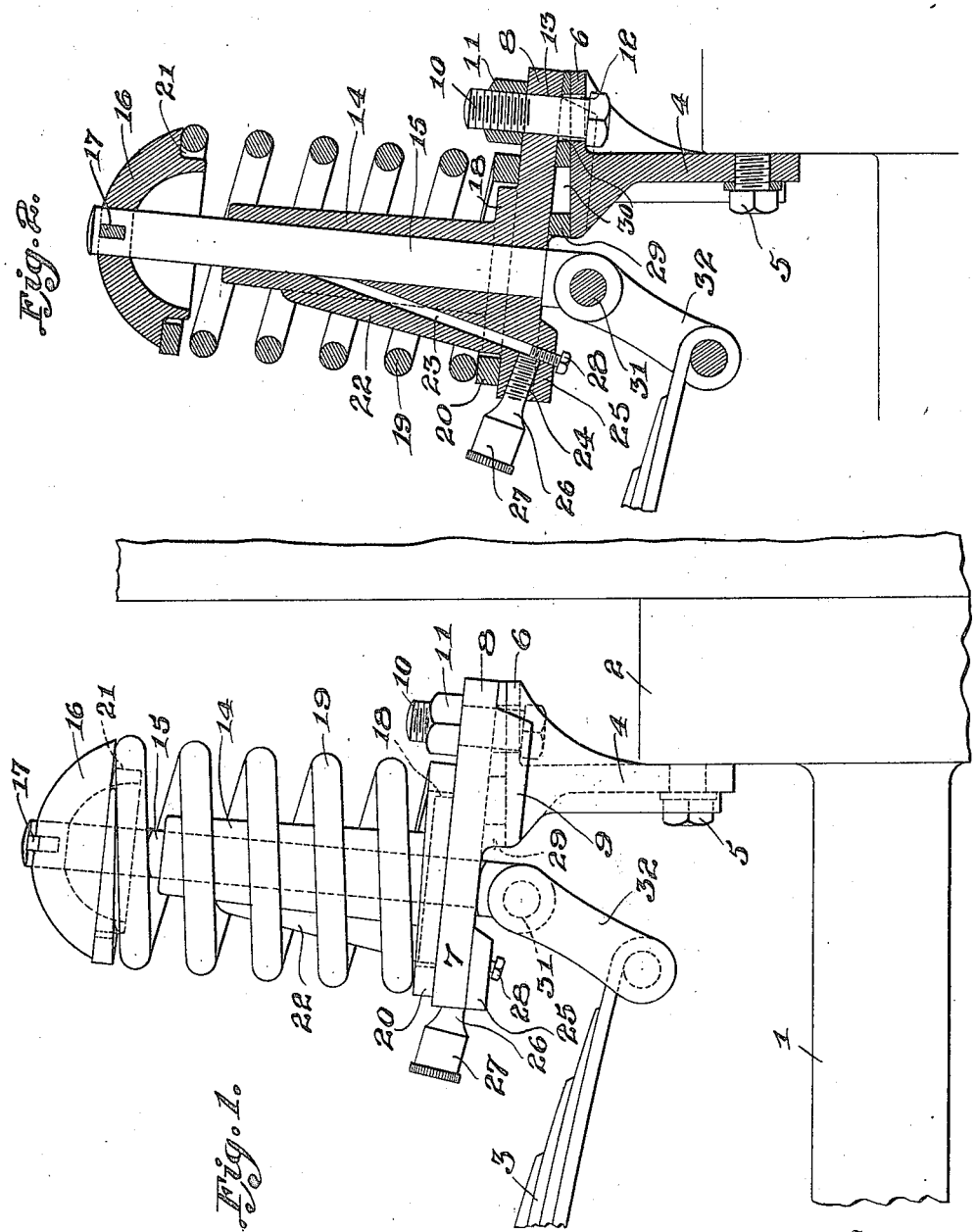

1,458,302

UNITED STATES PATENT OFFICE.

EDWARD KRUK, OF COPLAY, PENNSYLVANIA.

SHOCK ABSORBER.

Application filed November 22, 1921. Serial No. 516,991.

*To all whom it may concern:*

Be it known that I, EDWARD KRUK, a citizen of the United States, residing at Coplay, in the county of Lehigh and State of Pennsylvania, have invented certain new and useful Improvements in Shock Absorbers; and I do hereby declare the following to be a full, clear, and exact description of the invention, such as will enable others skilled in the art to which it appertains to make and use the same.

This invention relates to new and useful improvements in shock absorbers and more particularly to a shock absorber for motor vehicles, the main object of the present invention being the provision of a shock absorber which can be quickly and readily applied to a motor vehicle or removed therefrom for the purpose of absorbing the shock or jar generally conveyed to the body of the vehicle while passing over rough and uneven roads.

Another object of the invention is the provision of a shock absorber which has special facilities for applying lubricant thereto and wherein the lubricant will be conveyed to all parts of the absorber which is desired to be lubricated.

A further object of the invention is the provision of a shock absorber which can be readily adjusted whereby the weight of the shock will be increased or decreased according to the position of the absorber.

With the above and other objects in view, the invention consists in the novel features of construction, combination and arrangement of parts hereinafter more fully set forth, pointed out in the claims and shown in the accompanying drawings, in which:

Figure 1 is a side elevation of a shock absorber constructed in accordance with my invention illustrating the manner of applying the same to the rear portion of a vehicle;

Fig. 2 is a vertical sectional view taken through the absorber and supporting parts;

Fig. 3 is a side elevation of the absorber illustrating the manner of supporting the same at the forward end of a vehicle;

Fig. 4 is a top plan view of the body plate;

Fig. 5 is a side elevation of the body;

Fig. 6 is a plan view of the wedge used for adjusting the angles of the absorber, and Fig. 7 is a side elevation of the same.

Referring more particularly to the drawings, the numeral 1 indicates the axle housing of the rear axle of a vehicle and 2 represents the brake housing. As illustrated in Figs. 1 and 2 of the drawings, my improved shock absorber is supported from the brake housing of the vehicle and in order to support the absorber in its proper position relative to the spring member 3, a bracket 4 is provided, the lower end of which is bolted to the housing 2 by means of the bolt 5. The upper portion of the bracket 4 is provided with a horizontal supporting table 6 upon the body of the absorber is mounted. The main body portion of the absorber which is generally indicated at 7 is circular in form with the exception of a projecting arm 8 which rests upon the table portion 6 of the bracket 4 and is provided with downturned side flanges 9 which embrace the sides of the table 6 to prevent any lateral movement of the base portion 7 of the absorber when mounted upon the table 6. The absorber is secured to the table portion of the bracket by means of a bolt 10 having a nut 11 threaded upon its upper end after the bolt has been inserted through the openings 12 and 13, the opening 12 being formed in the table portion of the bracket and the opening 13 formed in the arm 8.

Extending upwardly from the base 7 is a hollow stem 14, the opening within said stem extending down through the base 7 centrally thereof and mounted within this opening is a shaft 15, the upper end of which projects above the stem 14 and mounted thereon is a cap member 16 retained in place by means of the cross pin 17.

Formed integral with the base 7 and surrounding the lower portion of the stem 14 is a guide 18 which is surrounded by the lower portion of the spring 19. It will be noted that in order to have the lower end of the spring 19 rest upon the base portion 7, the lower coil of the spring is provided with a flattened portion 20 which extends around the guide 18 and is retained in its proper relative position with respect to the stem 14 by means of the guide 18. This spring 19 is retained in position by means of the cap 16, said cap being hollow in cross section and its lower edge provided with an annular recess 21 in which the upper coil of the spring fits in order to retain the spring in position.

Formed integral with the stem 14 upon one side thereof is a housing or enlarged portion 22 having an opening therethrough as at 23 communicating with the opening in the stem 14. This opening 23 communicates with an inlet 24 formed in the enlarged portion 25 on the base 7 and threaded into this inlet 24 is a stem 26 formed integral with a lubricant receptacle 27. From this it will be apparent that by placing lubricant within the receptacle 27, the lubricant will be conveyed upwardly through the passage 23 to the interior of the stem 14, it being understood that the lubricant receptacle 27 is of the force feed type whereby the lubricant will be forced upwardly through the passage 23. The lower end of this passage 23 is normally closed by means of a set screw 28 which is threaded into the lower end of the passage to retain the lubricant in place, but can be removed should it be desired to clean out the passage 23.

The base member 7 and the portions of the absorber mounted thereon can be normally disposed in a horizontal position if so desired, but should it be desired to increase the action of the absorber upon the shock conveyed to the body of the vehicle, a wedge member 29 is inserted between the table portion 6 of the bracket 4 and the base of the absorber as illustrated in Figs. 1 and 2. The present position of the wedge 29 is such that the absorber is shown in a tilted position. Should it be found desirable to tilt the absorber in the opposite direction, the position of the wedge 29 can be readily reversed as the wedge is provided with the two spaced openings 30 to thus permit the reversal of the wedge and have the same retained in position through the medium of the bolt 10.

The shaft 15 is connected by means of the bolt 31 to the spring 3, through the medium of the link 32 whereby the action of the spring will be conveyed to the shaft 15 and the shock absorber through the action of the spring 19 as the shaft 15 is connected with the spring 19 through the medium of the cap member 16.

In Fig. 3 I have illustrated the specific manner of securing the absorber to the front axle of a vehicle. This manner of securing the device to the front axle consists in having a bolt 33 extended through the front axle 34 at a point removed from the wheel ends, said bolt being provided upon its upper end with a bracket 35 having a transverse sleeve 36 at its outer end and further provided with a shoulder 37 formed midway between the bolt 33 and the shoulder 36.

In order to mount the base portion 7' of the absorber upon the bracket 35, a U-shaped supporting member 38 is provided, the intermediate portion of which is arranged between the downwardly projecting flanges 9' of the base 7' and secured thereto by means of the bolt 39.

In order to support the base member 7' and also the remaining parts of the absorber in various adjusted positions, a transverse bolt 40 is provided, said bolt extending through the side walls of the supprting member 38 and provided with a nut 41 upon one end whereby the bolt can be removed when desired. Mounted upon this bolt 40 is a sleeve 42 and the bolt 40 and the sleeve 42 are adapted to rest upon the shoulder 37 formed on the bracket 35. As illustrated in Fig. 3, the absorber is shown in a tilted position, the sleeve 42 being mounted upon the bolt 40 and normally resting upon the shoulder 37. Should it be desired to move the absorber to a more horizontal position, the sleeve 42 is removed from the bolt 40 and the bolt drops downwardly until it rests upon the shoulder 37 and it will be further apparent that when it is desired to raise the absorber again, the sleeve 42 can again be mounted upon the bolt 40 to raise the absorber to the tilted position as shown in Fig. 3.

It is apparent that by moving the absorber to the various positions, the weight to be applied to the spring 19' which absorbs the shock will be varied, for instance, if the roads over which the vehicle is travelling are fairly smooth the absorber can be disposed in a horizontal position as there will not be as much need for movement on the part of the shaft 15' as if the roads were rather rough and bumpy, and in this case, the absorber is tilted to the position shown in Fig. 3, so that greater shocks which might be conveyed to the body of the vehicle can be absorbed through the spring 19'. This tilting of the body is also necessary in view of the fact that the link 32' which connects the shaft 15' with the spring 3' is arranged directly over the axle 32, thus it will be necessary to raise or lower the link 32' in accordance with the amount of shock which must be absorbed by the spring 19'.

It will be apparent from the above that I have provided an extremely simple shock absorber which can be quickly and readily applied to a motor vehicle and which will be positive in its action in removing the greater portion of the shock and jar from the body of the vehicle.

I claim:

1. In a device of the character described comprising a base, a rod slidable relative the base and spring means operative between the base and the rod and means for securing the base to the frame of a vehicle including a reversible wedging means for varying the inclination of the rod relative the vehicle.

2. In a device of the character described a bracket having a flat bearing face, a shock absorber having a base, a rod slidable relative the base and compression spring means operative between the rod and the base, and a reversible wedging means for securing the base of the shock absorber to the bearing face of the bracket at various inclinations.

3. In a device of the character described a bracket adapted to be rigidly secured to the frame of a vehicle and having a flat bearing face, a shock absorber having a base with a flat bearing face and means for securing the flat bearing face at varying inclinations relative the bearing face of the bracket comprising a reversible wedge adapted to be interposed between said bearing faces as and for the purposes specified.

In testimony whereof I affix my signature.

EDWARD KRUK.